(12) United States Patent
Chen et al.

(10) Patent No.: US 11,184,086 B1
(45) Date of Patent: Nov. 23, 2021

(54) RECOVERY OF PHASE-MODULATED DATA FROM AN OPTICAL SIGNAL VIA INTENSITY MEASUREMENTS

(71) Applicant: Nokia Solutions and Networks Oy, Espoo (FI)

(72) Inventors: Haoshuo Chen, Aberdeen, NJ (US); Nicolas Fontaine, Keyport, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/943,782

(22) Filed: Jul. 30, 2020

(51) Int. Cl.
| | |
|---|---|
| *H04B 10/077* | (2013.01) |
| *H04B 10/03* | (2013.01) |
| *H04B 10/67* | (2013.01) |
| *H04B 10/69* | (2013.01) |
| *H04J 14/06* | (2006.01) |
| *H04B 10/548* | (2013.01) |

(52) U.S. Cl.
CPC ......... *H04B 10/0775* (2013.01); *H04B 10/03* (2013.01); *H04B 10/548* (2013.01); *H04B 10/67* (2013.01); *H04B 10/69* (2013.01); *H04J 14/06* (2013.01)

(58) Field of Classification Search
CPC .. H04B 10/0775; H04B 10/548; H04B 10/69; H04B 10/67; H04B 10/03; H04J 14/06
See application file for complete search history.

(56) References Cited

U.S. PATENT DOCUMENTS

| 10,715,256 B1 | 7/2020 | Chen et al. | |
| 2009/0208216 A1* | 8/2009 | Ellis | H04B 10/69 398/81 |

OTHER PUBLICATIONS

H. Chen et al., "Full-Field, Carrier-Less, Polarization-Diversity, Direct Detection Receiver based on Phase Retrieval", Mar. 6, 2019, 3 pages, available online at: https://arxiv.org/ under article No. 1903.02424.

Y. Yoshida et al, Coherent Detection only by 2-D Photodetector Array: A Discreteness-Aware Phase Retrieval Approach, Optical Fiber Communications Conference and Exhibition (OFC), Mar. 3-7, 2019, paper Th4A.3, 3 pages.

A. Mecozzi et al., "Kramers-Kronig Coherent Receiver", Optica, vol. 3, No. 11, 2016, pp. 1220-1227.

Chen, Haoshuo et al., "Recovery of Phase-Modulated Data From an Optical Signal Via Intensity Measurements", U.S. Appl. No. 16/290,854, filed Mar. 1, 2019, 26 pages.

* cited by examiner

*Primary Examiner* — Leslie C Pascal
(74) *Attorney, Agent, or Firm* — Nokia Technologies Oy

(57) ABSTRACT

An apparatus includes a direct-detection optical data receiver to receive a data-modulated optical carrier. The direct-detection optical data receiver includes an optical power splitter, an array of at least three optical intensity detectors, and a digital signal processor. The digital signal processor is connected to receive digital values of intensity measurements of each of the optical intensity detectors of the array and to recover data of the received data-modulated optical signal from the digital values of the intensity measurements. The first optical intensity detector is connected to receive light from the optical power splitter via a dispersive optical path and the remaining of the optical intensity detectors of the array are connected to receive light from the optical power splitter via a multiple input and multiple output passive optical processing unit. The passive optical processing unit is configured to optically mix light received on different optical inputs thereof.

17 Claims, 4 Drawing Sheets

RECOVERY OF PHASE-MODULATED DATA FROM AN OPTICAL SIGNAL VIA INTENSITY MEASUREMENTS

BACKGROUND

Technical Field

The inventions relate to apparatus and methods for optical fiber communication based, at least, in part on phase-modulation of data.

Discussion of the Related Art

This section introduces aspects that may be helpful to facilitating an understanding of the inventions. Accordingly, the statements of this section are to be read in this light and are not to be understood as admissions about what is prior art or what is not prior art.

Various data communications techniques transmit a data-modulated optical carrier over an optical fiber. To increase the data capacity and spectral efficiency of such fiber-based data communications, some optical fiber communication systems use phase modulation techniques, in which independent data streams are carried on in-phase (I) and quadrature-phase (Q) components of an optical signal. Such quadrature phase shift keying (QPSK) techniques can be based on more complex constellations, e.g., quadrature amplitude modulation (QAM) constellations with 8, 16, 32, 64, or more data symbol values.

For optical fiber communications based on phase-modulation, the optical data receiver may be a coherent optical data receiver, which has a local optical oscillator or a direct-detection (DD) optical data receiver, which does not have local optical oscillator. DD optical data receivers may provide lower-cost apparatus for recovering data from a phase-modulated optical signal than coherent optical data receivers. Unfortunately, some DD optical data receivers have disadvantages. For example, some Kramers-Kronig (KK) optical data receivers suffer from frequency fading, and some other DD optical data receivers require the received optical signal to include both an unmodulated optical carrier and a data-carrying sideband optical signal.

BRIEF SUMMARY OF EXEMPLARY EMBODIMENTS

A direct-detection (DD) optical data receiver may recover phase-modulated data from a received optical signal based on intensity measurements of multiple projections thereof. Such intensity measurements are performed without optically mixing the data-modulated optical signal with an unmodulated optical carrier, i.e., an unmodulated optical carrier either co-transmitted with the data-modulated optical signal or produced by a local optical oscillator. Unfortunately, the data recovery algorithms of some such DD optical data receivers recover can require many iterations of digital computations to determine data-modulated phases of the optical signal with low error rates. Such computational complexity may also require very substantial processing hardware in a digital signal processor (DSP) of the optical data receiver.

Herein, some embodiments of DD optical data receivers measure intensities of multiple optical projections of a data-modulated optical signal to recovery phase-modulated data therefrom. Some such DD optical data receivers can use algorithms for data recovery that are less complex, e.g., have lower latencies for convergence, than algorithms of other DD optical data receivers, which rely on intensity measurements of multiple optical projections of a data-modulated optical signal. The lower latencies may be result from few computational iterations of the phase recovery algorithms for acceptable convergence in the digital signal processors (DSPs) of some such DD optical data receivers. Thus, the digital signal processors of some such DD optical data receivers may be simpler and less costly, but some optical front-ends and associated analog electrical processing circuitry of such DD optical data receivers may be more complex.

In first embodiments, an apparatus includes a direct-detection optical data receiver to receive a data-modulated optical carrier. The direct-detection optical data receiver includes an optical power splitter, an array of at least three optical intensity detectors, and a digital signal processor. The digital signal processor is connected to receive digital values of intensity measurements from each of the optical intensity detectors of the array and to recover data of the received data-modulated optical signal from the digital values of the intensity measurements. The first optical intensity detector is connected to receive light from the optical power splitter via a dispersive optical path and the remaining of the optical intensity detectors of the array are connected to receive light from the optical power splitter via a multiple input and multiple output passive optical processing unit. The passive optical processing unit is configured to optically mix light received on different optical inputs thereof.

In any of the first embodiments, the passive optical processing unit may be configured to optically mix light received at least two optical inputs thereof with a relative time delay. In any such embodiments, the relative time delay may be bigger than a temporal broadening produced by the dispersive optical path on data symbols of the received data-modulated optical signal.

In any of the first embodiments, the passive optical processing unit may be configured to optically mix light received from at least three of the optical inputs thereof.

In any of the first embodiments, the apparatus may be configured to not optically mix light in the dispersive optical path with light in the passive optical processing unit.

In some of the first embodiments, the apparatus may include at least four of the optical intensity detectors and the passive optical processing unit may have at least, three optical inputs and three optical outputs.

In any of the first embodiments, the digital signal processor may be configured to recover, at least, phase-modulated data of the received data-modulated optical signal from the digital values of intensity measurements. In some such embodiments, the passive optical processing unit may be configured to optically mix light from at least two optical inputs thereof with a relative time delay. In such some embodiments, the relative time delay may be bigger than a temporal broadening produced by the dispersive optical path on data symbols of the received data-modulated optical signal. In some embodiments of this paragraph, the apparatus may be configured to not optically mix light in the dispersive optical path with light in the passive optical processing unit. In some embodiments of this paragraph, the apparatus may include at least four of the optical intensity detectors and the passive optical processing unit may have at least, three optical inputs and three optical outputs.

In any of the first embodiments, the direct-detection optical data receiver may be configured, at least, to recover phase-modulated data from two polarizations of a polarization multiplexed optical signal.

Any of the first embodiments may also include an optical data transmitter configured to phase-modulate data onto an optical carrier and optically connected to transmit the phase-modulated optical carrier to the direct-detection optical data receiver.

In any of the first embodiments, the digital signal processor may be configured to determine data carried by the received data-modulated optical signal by digitally estimating optical projections thereof by the dispersive optical path and the passive optical processing unit. In some such embodiments, the digital signal processor may be configured to correct said digital estimates of the optical projections based on the digital values of the measured intensities.

BRIEF DESCRIPTION OF THE DRAWINGS

In the Figures and text, like reference symbols indicate elements with similar or the same function and/or similar or the same structure(s).

In the Figures, relative dimension(s) of some feature(s) may be exaggerated to more clearly illustrate the feature(s) and/or relation(s) to other feature(s) therein.

Herein, various embodiments are described more fully by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

This application incorporates herein, by reference, in its entirety, U.S. patent application Ser. No. 16/290,854, filed by Haoshuo Chen et al on Mar. 1, 2019.

Various embodiments of optical data receivers recover phase(s) modulated onto a received data-modulated optical signal from measured intensities of optical projections of the received data-modulated optical signal. The optical projections are typically produced by passive optical processing and typically do not involve interference of said data-modulated optical signal with an unmodulated optical carrier from a local optical oscillator or from a co-propagated unmodulated optical carrier. The passive optical processing may include producing three or more different optical projections of the received data-modulated optical signal. Intensity measurements of said optical projections enable, at least, recovery of phase-modulations carried by the data-modulated optical signal and may also enable recover of amplitude modulations thereon in some embodiments. In some embodiments, the DD optical data receiver may have photonic integrated devices therein, e.g., the passive optical processing may be performed by a substantially planar integrated photonic circuit.

Herein, "optical signal" refers to an optical signal in one wavelength channel, and the signal may typically have one polarization mode. But, some embodiments may include parallel optical and/or electrical processing structures, e.g., of similar form, to support wavelength division multiplexing (WDM), polarization division multiplexing, and/or super channel, multiple sub-carrier, optical communications.

Figure 1:
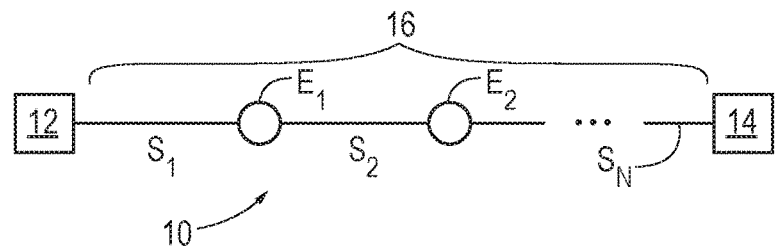
FIG. 1 is block diagram schematically illustrating an optical fiber communication system based on a direct-detection (DD) optical data receiver that uses multiple optical projections of a received optical signal to recover data phase-modulated thereon.

FIG. 1 schematically illustrates an optical fiber communication system 10 that includes an optical data transmitter 12, a DD optical data receiver 14, and an optical fiber line 16 that all-optically connects the optical data transmitter 12 to the DD optical data receiver 14. The optical data transmitter 12 is configured to transmit a data-modulated optical signal to the optical data receiver 14. The optical signal carries data modulated thereon according to a phase-modulation scheme, e.g., binary phase shift keying (BPSK), QPSK, and/or N-QAM for N>4. The DD optical data receiver 14 recovers the optically transmitted data from the received optical signal by intensity measurements of multiple optical projections thereof, as described below. The optical fiber line 16 may include one or more optical fiber spans $S_1, S_2, \ldots S_N$, e.g., single-mode optical fibers all-optically end-connected by optical devices $E_1, E_2$, e.g., such as optional optical amplifiers and/or optical add/drop nodes.

In various embodiments, the optical fiber communication system 10 may provide metro, regional, long-haul, short-reach, or inter-data center optical fiber communications.

Figure 2:
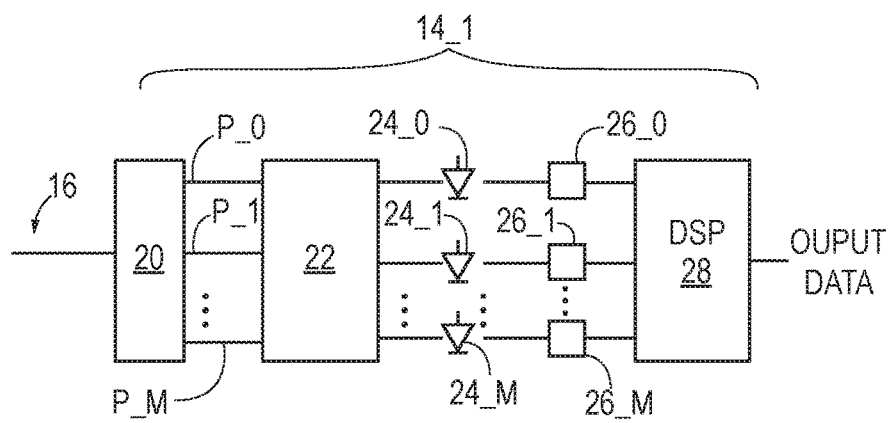
FIG. 2 is a block-diagram schematically illustrating a DD optical data receiver configured to use multiple optical projections of the received optical signal, e.g., in the optical fiber communication system of FIG. 1.

FIG. 2 schematically illustrates an embodiment 14_1 of the DD optical data receiver of FIG. 1. The DD optical data receiver 14_1 includes a 1×(M+1) optical power splitter 20, an (M+1)×(M+1) passive optical processing unit 22, an array of (M+1) photodetectors 24_0, 24_1, . . . 24_M, (M+1) analog electrical sampling circuits 26_0, 26_1, . . . 26_M, and a DSP 28 with (M+1) digital inputs. Here, M is an integer greater than or equal to 2.

The 1×(M+1) optical power splitter 20 splits the data-modulated optical signal received from the optical fiber line 16 into (M+1) separate portions and directs each of the portions to a corresponding one of (M+1) optical paths P_0, P_1, . . . P_M. The 1×(M+1) optical power splitter 20 may be a conventional symmetric or non-symmetric, passive optical power splitter. The individual optical paths P_0-P_M direct the portions of the received data-modulated optical signal to corresponding optical inputs of the (M+1)×(M+1) passive optical processing unit 22, approximately in parallel.

The (M+1)×(M+1) passive optical processing unit 22 forms (M+1) optical projections of the portions of the optical signal, which are received at the optical inputs thereof, e.g., by passive optical processing, and outputs the optical projections, in approximate parallel, to the (M+1) photodetectors 24_0-24_M. The (M+1) individual optical signals at the (M+1) optical outputs of the (M+1)×(M+1) passive optical processing unit 22 are typically different optical projections of the received optical signal. In the (M+1)×(M+1) optical processing unit 22, the optical processing, at least, includes dispersing the portion of the optical signal received from the first optical path P_0 and optically mixing the portions of the optical signal received from at least, two of the M optical paths P_1-P_M, and may also include relatively time delaying some of those portions, prior to said optically mixing. Typically, the DD optical data receiver 14_1 does not allow light in the dispersive first optical path 30 to significantly optically mix with light in the M+1)×(M+1) passive optical processing unit 22.

Each photodetector 24_0-24_M, receives light from a corresponding one of the optical outputs of the (M+1)×(M+1) optical processing unit 22 and transmits an electrical signal representative of the measured intensity of said received light to a corresponding one of the analog electrical sampling circuits 26_0-26_M. Each photodetector 24_0-24_M may be, e.g., a reversed biased photodiode, i.e., in a single ended configuration, or a suitably biased photosensitive transistor.

Each (M+1) analog electrical sampling circuit 26_0-26_M performs temporal sampling to provide analog-to-digital (A/D) conversion of the electrical intensity measurement received from the corresponding one of the photodetectors 24_0-24_M to a temporal series of digital values. The analog electrical sampling circuits 26_0-26_M digitize the intensity measurements, e.g., at a sampling rate equal to the data symbol rate or equal to an integer multiple of data symbol rate. The individual analog electrical sampling circuits 26_0-26_M optionally may include conventional analog electrical amplifiers and/or electrical filters for processing of received electrical signals prior to the A/D conversion thereof.

The DSP 28 receives, e.g., approximately in parallel, the (M+1) digital values for the intensity measurements of the optical projections from the analog electrical sampling circuits 26_0-26_M at (M+1) and recovers values representative of the transmitted data-modulated optical signal therefrom, i.e., including recovering phase modulated data. The recovery is based on parallel digital processing of the received digital values of the (M+1) intensity measurements of the passive optical projections, in a sampling period. Said recovery is typically also based on a recovery of pilot symbol values carried by the optical signal, in pilot symbol intervals, e.g., as discussed below.

In the DSP 28, the digital processing to recover the phase-modulated data uses, in part, information about optical channel matrices for the optical fiber line 16, the passive optical processing unit 22 and/or the communicating optical data transmitter 12 of FIG. 1. Herein, an optical channel matrix is a matrix that determines a sequence of output optical signals from one or more optical paths in response to the one or more optical paths receiving a sequence of input optical signals. In the DSP 28, the needed information about such optical channel matrices may be obtained prior to or during operation of the DD optical data receiver 14_1 by explicit measurement and programming or adjustment and/or by dynamic training or monitoring, e.g., based on reception of optical pilot symbols having known transmission forms and/or known transmission time slots.

The DSP 28 may also do digital processing to compensate or correct for undesired optical effects such as dispersion, attenuation, noise production, polarization rotation, optical non-linear distortion, and/or polarization rotation, which are, e.g., caused by propagation over the optical fiber line 16, etc.

Finally, the optical data receiver 14_1 may also include one or more optical filter(s), e.g., to enable wavelength channel selection and/or polarization selection (not shown) on the optical signal received from the near end of the optical fiber line 16 and/or optical amplifier(s) to compensate for some optical attenuation, e.g., in the optical fiber line 16.

Figure 3:
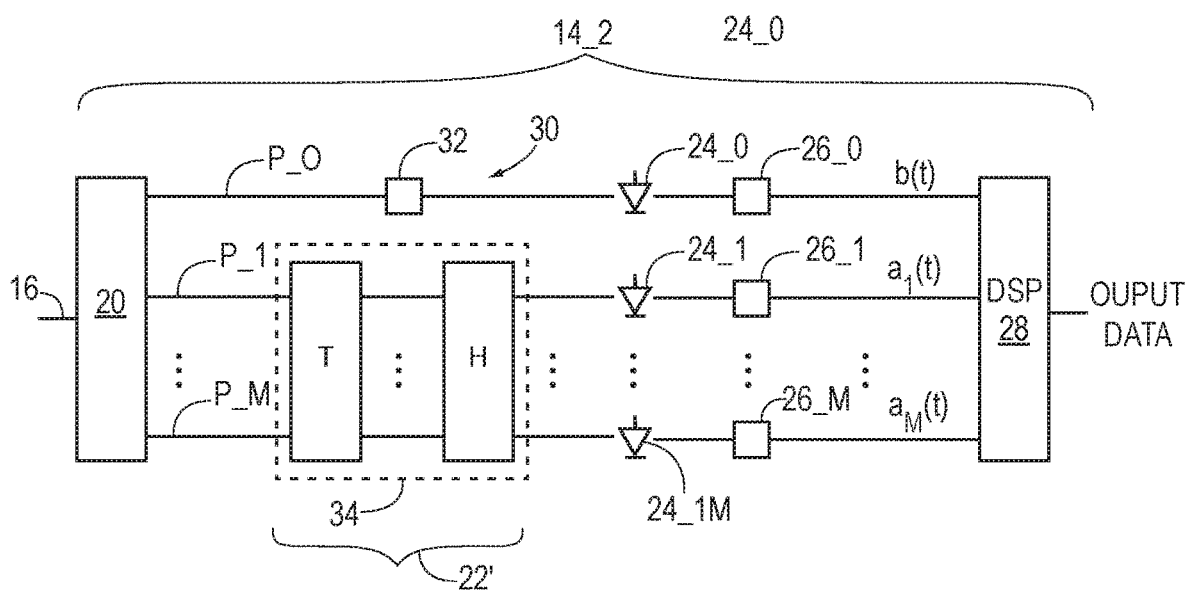
FIG. 3 is a block diagram schematically illustrating a DD optical data receiver with a specific embodiment of the M×M passive optical projection unit of FIG. 2.

FIG. 3 schematically illustrates an embodiment 14_2 of the optical data receiver 14_1 of FIG. 2 with a specific embodiment 22' of the (M+1)×(M+1) passive optical processing unit 22 of FIG. 2. The (M+1)×(M+1) passive optical processing unit 22' includes an optically separate first optical path 30 and an M×M passive optical processing unit 34. The first optical path 30 receives light only from the first optical path P_0. In parallel, the M×M passive optical processing unit 34 receives light only from the M remaining optical paths P_1-P_M. That is, the M×M passive optical processing unit 34 is a multiple input and multiple output, passive optical device. Also, the M optical paths P_1-P_M may be, e.g., short optical paths of about the same optical path length, at the operating wavelength of the optical receiver 14_1. The first optical path 30 and the M optical outputs of the M×M passive optical processing unit 34 direct (M+1) direct separate optical projections of the received data-modulated optical signal to corresponding ones of the (M+1) photodetectors 24_0, 24_1 . . . 24_M. The electrical outputs of the individual photodetectors 24_0 . . . 24_M are time-sampled by corresponding ones of the analog electrical sampling circuits 26_0, 26_1 . . . 26_M to produce, in parallel, M+1 digital intensity measurements b(t), $a_1(t)$ . . . $a_M(t)$, at sampling times "t". The digital intensity measurements b(t), $a_1(t)$ . . . $a_M(t)$ are sent, approximately in parallel, to the DSP 28.

The first optical path 30 typically includes an optically dispersive element 32 that optically disperses the portion of the optical signal received from optical path P_0. The optically dispersive element 32 produces substantial optical dispersion in the received portion of the optical signal, e.g., may cause optical mixing over multiple data symbol time slots. The optically dispersion element 32 may be, e.g., a length of chromatically dispersive optical fiber or another conventional optically dispersive device.

The M×M passive optical processing unit 34, at least, optically mixes light received from one or more pairs of the M optical paths P_1-P_M. The M×M passive optical processing unit 34 is formed by an M×M T module serially connected to an M×M H module.

The M×M T module introduces relative delay(s) between the light received from one or more pairs of the M optical paths P_1-P_M. Over the array of M optical paths P_1-P_M, the relative delays may, e.g., linearly increase from optical path to optical path of this array. One or more of the relative delays may be larger than the temporal broadening produced by dispersion in the first optical path 30. In other embodiments, the M×M T module may produce a distribution of relative delays between the M received portions of the data-modulated optical signal, e.g., such that the relative delay increases linearly with optical input to the M×M T module. The T module produces a diagonal linear transformation on the M received portions of the data-modulated optical signal, without causing significant optical mixing of light received from different ones of the optical paths P_1 to P_M.

The M×M H module optically mixes light received from different optical outputs of the T module. For example, the M×M H module may be an optical coupler that causes optical mixing of said light via evanescent optical fields.

The serial optical processing by the T module and then, the H module produces, at the M optical outputs of the passive optical processing unit 34, optical mixture(s) of the portions of the data-modulated optical signal received from the optical power splitter 20. In, one or more of said optical mixtures, the optically mixed portions of the received data-modulated optical signal may be relatively temporally delayed. The relative delay(s) may be larger than data symbol time slots and may be as big as or bigger than the temporal broadening produced by dispersion in the first optical path 30 on the portion received therein of the received data-modulated optical signal.

Figure 4:
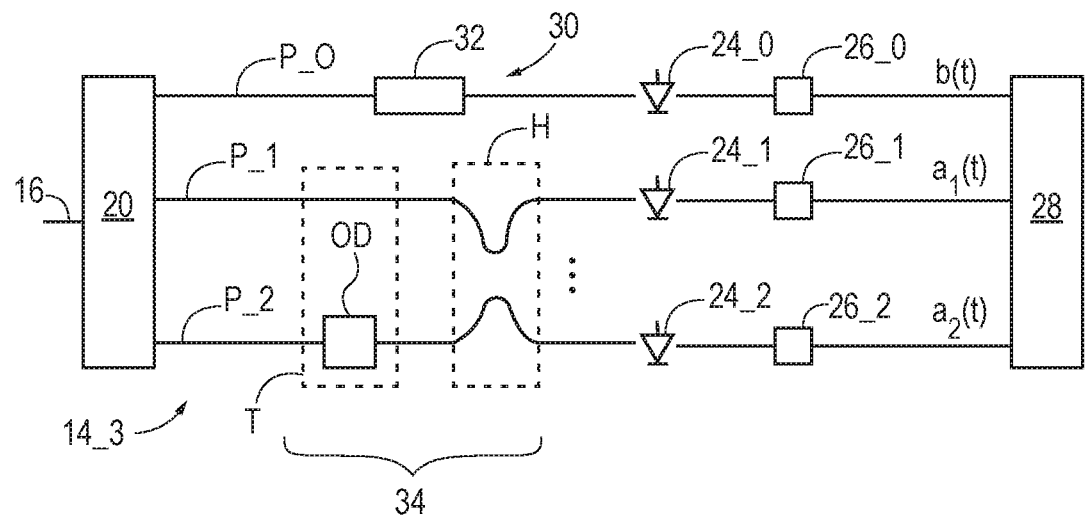
FIG. 4 is a block diagram schematically illustrating an embodiment of a DD optical data receiver according to FIGS. 2-3 with 3 photodetectors per polarization component.

FIG. 4 schematically illustrates an embodiment 14_3 of the DD optical data receivers 14_1, 14_2 of FIGS. 2-3, which includes a 1×3 optical power splitter 20. The 1×3 optical power splitter 20 has a first optical output that connects via optical path P_0 to the first optical path 30 and has second and third optical outputs that connect via respective optical paths P_1 and P_2 to the 2 optical inputs of the 2×2 passive optical processing unit 34.

The 1×3 optical power splitter 20 may be, e.g., a conventional symmetric or asymmetric 1×3 optical power splitter, e.g., an integrated planar optical device.

The first optical path 30 has a conventional optical dispersive element 32 there along. Light propagating through the first optical path 32 may, e.g., accumulate more dispersion than light propagating through optical paths of the 2×2 passive optical processing unit 34.

The 2×2 passive optical processing unit 34 includes a 2×2 T module that outputs light to a 2×2 H module. The 2×2 T module has two optically separate optical paths, e.g., free space and/or planar waveguide optical paths that do not significantly mix light received from different ones of the optical inputs of the 2×2 T module. One of the optical paths of the 2×2 T module has an optical delay element OD there along so that light propagating through said optical path is relatively temporally delayed with respect to light propagating through the other optical path of the 2×2 T module. The 2×2 H module optically mixes light received at the 2 optical inputs thereof, i.e., to function as a 2×2 non-diagonal matrix on the complex light fields or electromagnetic fields received at its 2 optical inputs. One example of such a 2×2 nondiagonal matrix is:

$$\begin{bmatrix} 1 & 1 \\ 1 & -1 \end{bmatrix}.$$

Alternatively, the 2×2 H module may perform other nondiagonal linear transformations on the light fields received at its optical inputs. The 2×2 H module may be a 2×2 passive optical power coupler, e.g., a 2×2 planar waveguide coupler with an evanescent light mixing segment as illustrated in FIG. 4 or a free-space optical mixer.

In the DD optical data receiver 14_3, light from the first optical path 30 and the 2 optical outputs of the 2×2 H module form 3 passive optical projections of data-modulated optical signal received from of the optical fiber line 16, and the intensities of these 3 passive optical projections are measured by corresponding ones of the photodetectors 24_0, 24_1, 24_2. The intensity measurements of the photodiode 24_0 are temporally sampled by the analog electrical sampling circuit 26_0 to produce the digital signal b(t). The intensity measurements of the photodiodes 24_1 and 24_2 are temporally sampled by the analog electrical sampling circuits 26_1 and 26_2 to produce the digital signals $a_1(t)$ and $a_2(t)$, respectively. The 3 digital signals b(t), $a_1(t)$, and $a_2(t)$ are digital values for the intensity measurements of three passive optical projections of the optical signal received from the optical fiber line 16. These sets of 3 digital values of the parallel intensity measurements are transmitted to the DSP 28, approximately in parallel, for use in recovery of phase and optionally amplitude values of the transmitted optical signal, e.g., as transmitted by the optical data transmitter 12 of FIG. 1.

Figure 5:
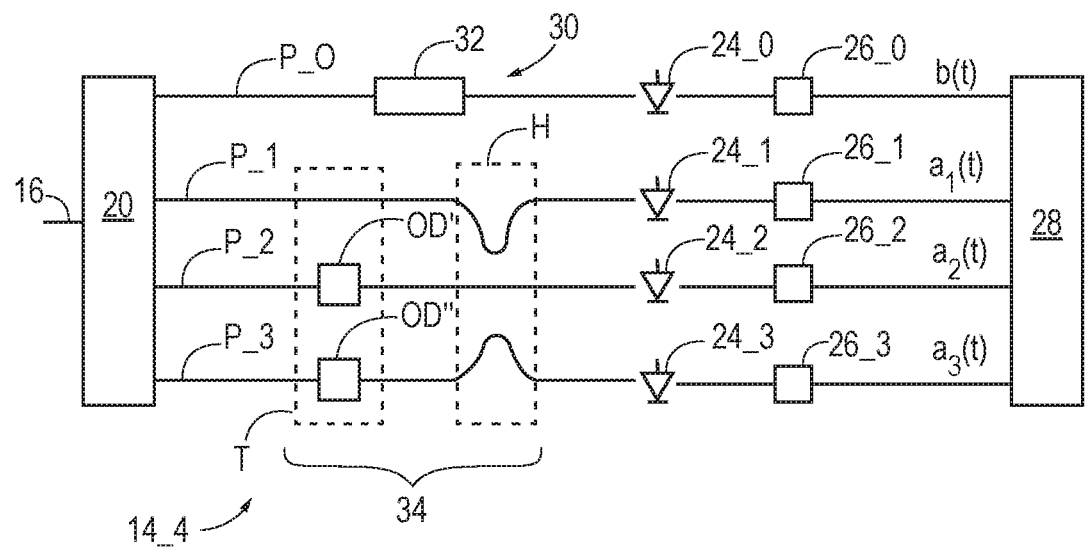
FIG. 5 is a block diagram schematically illustrating an embodiment of a DD optical data receiver according to FIGS. 2-3 with 4 photodetectors per polarization component.

FIG. 5 schematically illustrates an embodiment 14_4 of the DD optical data receivers 14_1, 14_2 of FIGS. 2 and 3. The DD optical data receiver 14_4 includes a 1×4 optical power splitter 20, i.e., a conventional symmetric or asymmetric optical power splitter. The 1×4 optical power splitter 20 has a first optical output that connects via optical path P_0 to the first optical path 30. The first optical path 30 was already described with respect to FIGS. 3-4. The 1×4 optical power splitter 20 has second, third, and fourth optical outputs that connect, in parallel, via the optical paths P_1, P_2, and P_3 to corresponding optical inputs of a 3×3 passive optical processing unit 34. The light output by the first optical path 30 and the 3 optical outputs of the 3×3 passive optical processing unit 34 correspond to 4 different passive optical projections of the data-modulated optical signal received from the optical fiber line 16.

The 3×3 passive optical processing unit 34 includes a 3×3 T module serially connected to a 3×3 H module. Properties of such T and H modules were already described with respect to FIGS. 3-4.

Here, the 3×3 T module has three, parallel and optically separate optical paths. One or two of said optical paths have an optical delay element OD', OD", which causes light received from 2 or 3 different ones of the optical paths P_1, P_2, and P_3 to be relatively delayed at the optical outputs of the 3×3 T module. For example, the produced relative delay may about the same between optical paths P_1 and P_2 and between optical paths P_2 and P_3. Other embodiments may produce another distribution or relative delays between the light received from the 3 optical paths P_1-P_M.

The 3×3 H module optically mixes light received on two or more of the 3 optical inputs thereof, i.e., optically mixes light from different optical outputs of the 3×3 T module. The 3×3 H module functions as a 3×3 nondiagonal matrix, on the complex light fields at its 3 optical inputs, i.e., due to the optical mixing. One example of the 3×3 nondiagonal matrix for the 3×3 H module is:

$$\begin{bmatrix} 1 & 1 & 1 \\ 1 & -0.5 - 0.87i & -0.5 + 0.87i \\ 1 & -0.5 + 0.87i & -0.5 - 0.87i \end{bmatrix}.$$

Here, "i" is the square root of −1. Alternatively, the 3×3 H module may correspond to another nondiagonal 3×3 matrix transformation on the 3 complex light fields at its 3 optical inputs. The 3×3 H module may be, e.g., a conventional 3×3 passive optical power coupler such as the 3×3 planar optical waveguide optical mixer with an evanescent field coupling segment as schematically illustrated in FIG. 4.

At 2 or 3 of its optical outputs, the 3×3 H module may output mixture(s) of relatively delayed portions of the light received from the three optical paths P_1-P_3 due to relative delay(s) introduced into light transmitted to the different optical inputs of the 3×3 H module by the 3×3 T module.

In the DD optical data receiver 14_3, light from the first optical path 30 and the 3 optical outputs of the 3×3 H module form 4 different optical projections of the data-modulated optical signal received from the optical fiber line 16. The intensities of these 4 different optical projections are measured by corresponding ones of the photodetectors 24_0, 24_1, 24_2, and 24_3. The intensity measurement of the photodiode 24_0 is temporally sampled by the analog electrical circuit 26_0 to produce the digital signal b(t). The intensity measurements of the photodiodes 24_1, 24_2 and 24_3 are temporally sampled by the analog electrical sampling circuits 26_1, 26_2, and 26_3 to produce the digital signals $a_1(t)$, $a_2(t)$, and $a_3(t)$, respectively. The 4 digital values b(t), $a_1(t)$, $a_2(t)$, and $a_3(t)$ are transmitted to the DSP 28, approximately in parallel, for use in recovery of transmitted phase and optionally amplitude values of the received data-modulated optical signal, e.g., to recover the temporal series of data symbol values transmitted by the optical data transmitter 12 of FIG. 1.

In the DD optical data receivers 14_2, 14_3, 14_4 of FIGS. 3-5, the DSP 28 may use an iterative algorithm to recover values of the transmitted data-modulated optical signal x'(t), for sample times "t", e.g., to determine a temporal series of phases and optionally amplitudes of said transmitted optical signal. Such recovery of temporal values of the transmitted phase-modulated optical signal x'(t) is made from the intensity measurements, i.e., b(t), $a_1(t)$ . . . $a_M(t)$, of the (M+1) passive optical projections of the received optical signal s(t), i.e., by the photodetectors 24_0-24_M and analog electrical sampling circuits 26_0-26_M as already described. The recovery of temporal values of the data-modulated transmitted optical signal, which carries some data by phase modulation, can be performed, by the DSP 28 from only the measured intensities of such optical projections.

Figure 6:
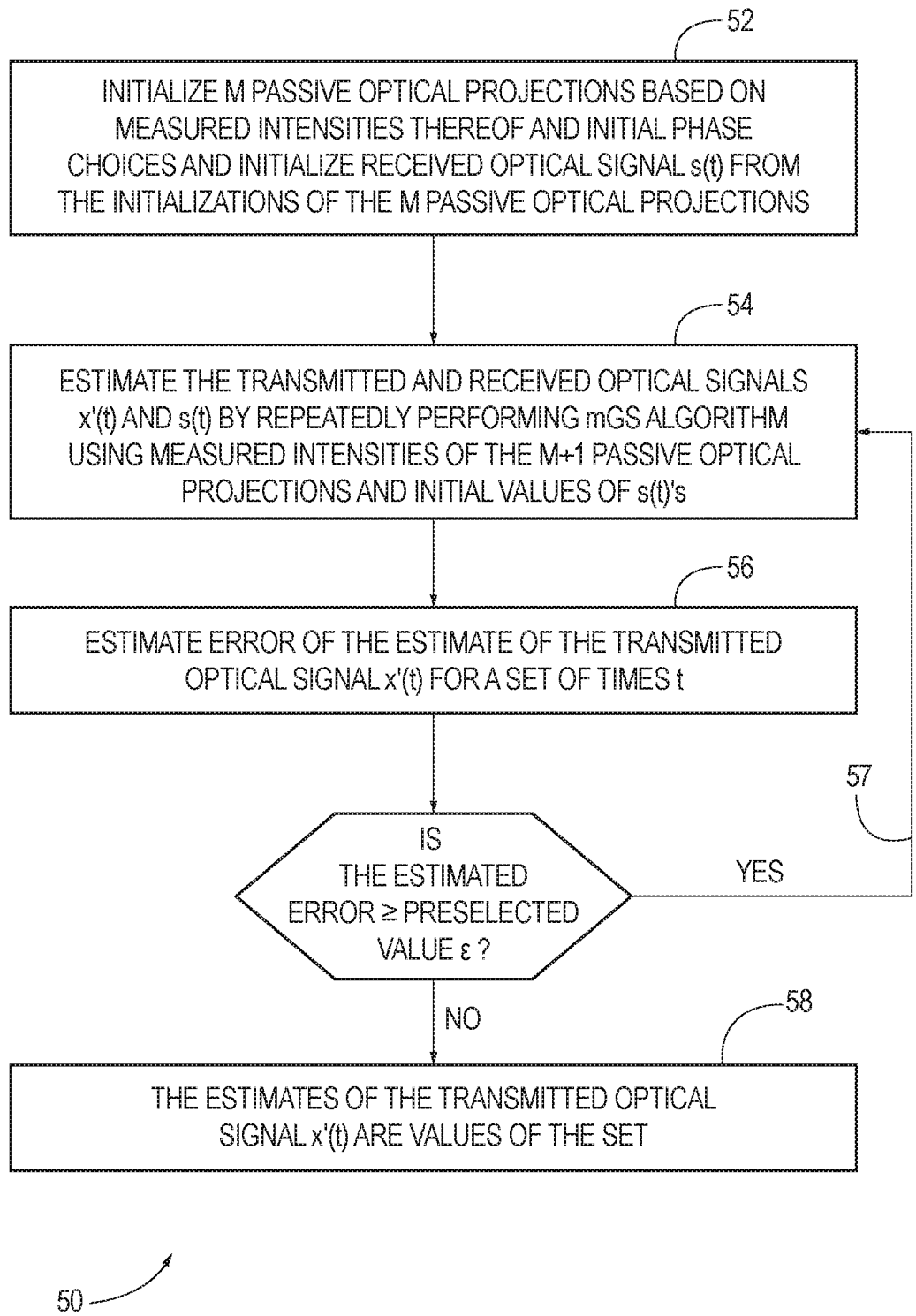
FIGS. 6-7 are flow charts schematically illustrating algorithms for optical signal recovery in a digital signal processor based on intensity measurements of multiple optical projections of a received optical signal, e.g., algorithms for use in the digital signal processors of the DD optical data receivers of FIGS. 2-5.
Figure 7:
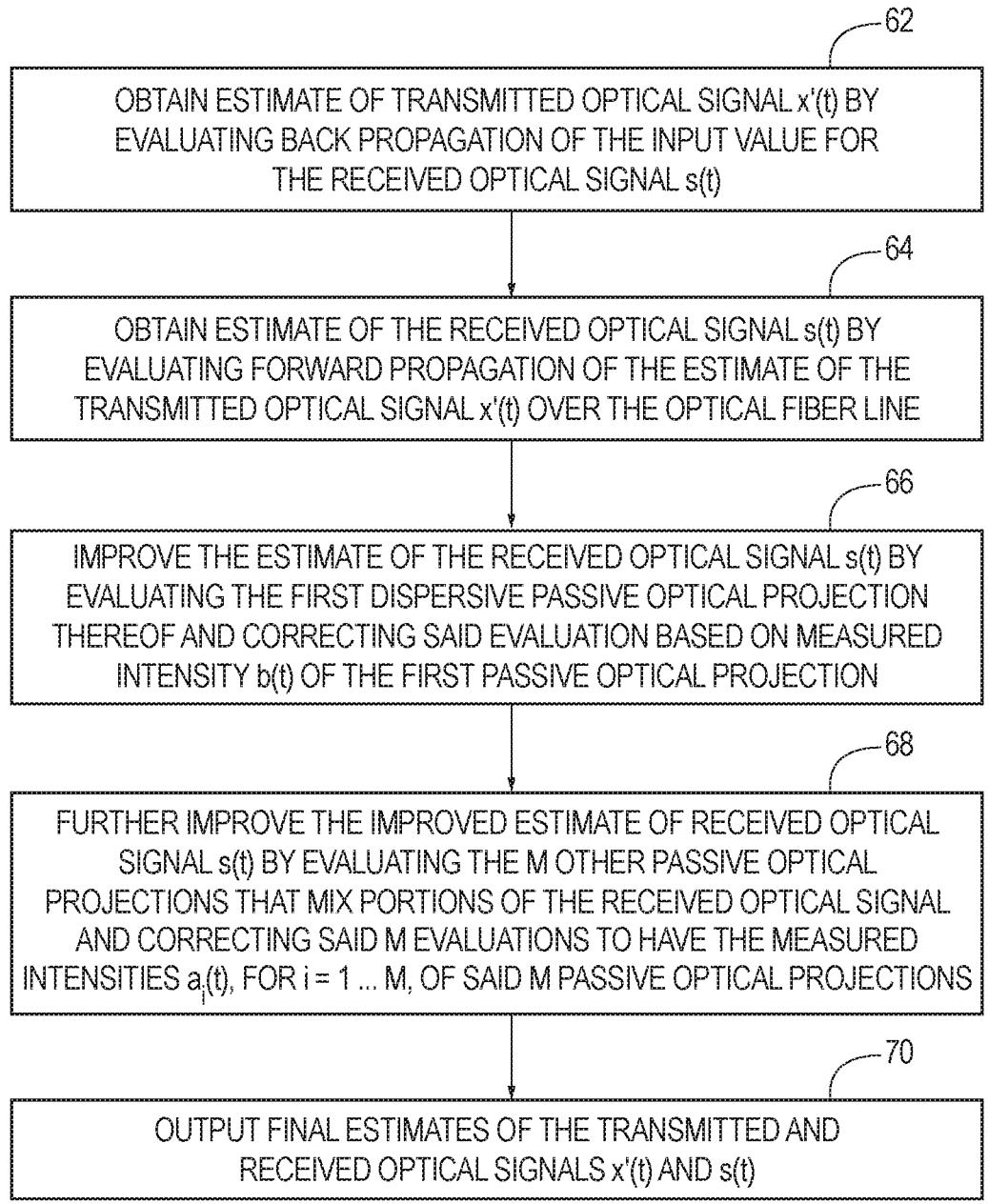

For the DSPs 28 of FIGS. 3-5, an example method for the recovery of the phase and amplitude values of the transmitted optical signal x'(t), from intensity measurements of passive optical projections of the received optical signal s(t) is illustrated in FIGS. 6 and 7. The example method includes performing a phase retrieval (PR) algorithm 50, e.g., as illustrated in Pseudo-Code Block A, and performing a modified Gerchberg-Saxton (mGS) algorithm 60, e.g., as illustrated in Pseudo-Code Block B. Both the PR and mGS algorithms 50, 60 use the intensity measurements of the (M+1) passive optical projections of the received data-modulated optical signal s(t), i.e., received from the optical fiber line 16, to estimate the transmitted phase-modulated optical signal x'(t) for sample times "t". The PR and mGS algorithms 50, 60 recover transmitted phase and amplitude values based on known optical properties of the optical fiber line 16, i.e., between the optical data transmitter 12 and the DD optical data receiver 14_2, 14_3, or 14_4, and known optical properties of the (M+1) passive optical projections done in the DD optical data receiver 14_2, 14_3, 14_4. Such optical properties, e.g., optical channel matrices, may be obtained, e.g., by measurement and pre-programming of the DSP 28 or by training of the DD optical data receiver 14_2, 14_3, 14_4.

Referring to FIG. 6 and Pseudo-Code Block A, the PR algorithm 50 iteratively evaluates the transmitted optical signal x'(t) from the intensity measurements b(t), {$a_i(t)$} of the M+1 passive optical projections of the received optical signal s(t) in the DD optical data receiver 14_2, 14_3, 14_4, e.g., for a block of sampling times t. In the Pseudo-Code Block A, integers N and K are preselected to fix numbers of iterations for various program loops therein.

At step 52, the PR algorithm 50 includes initializing the phases of the M values for the M passive optical projections $A_1(t)$ . . . $A_M(t)$ produced by the passive optical processing unit 34 of FIGS. 3-5. This step 52 also includes initializing the value of the received optical signal s(t) from the M initialized values of the $A_i(t)$'s. In the example of in Pseudo-Code Block A, the phases of the $A_i(t)$'s are randomly initialized, but different initializations may be used for these M phases. The initialized $A_i(t)$'s are determined from their measured intensities $a_1(t)$ . . . $a_M(t)$ and the initial phases therefor. In the example of the Pseudo-Code Block A, an initial value of s(t) is obtained by evaluating a back propagation by operating with the M-element matrix $\Sigma \cdot \{H \cdot T\}^{-1}$ on the initialized M-element array A(t), i.e., the i-th entry of A(t) is $A_i(t)$. Here, $\Sigma$ is the optical power combiner that performs the time reversed operation of the 1×(M+1) optical power splitter 20 for M optical outputs thereof, and H and T are the known M×M matrices for the respective H and T modules of the passive optical processing unit 34 of FIGS. 3-5.

At step 54, the PR algorithm 50 includes iteratively executing the mGS algorithm 60 to obtain new estimates of the transmitted and received optical signals x'(t) and s(t) from a previously value for the received optical signal s(t) and the measured intensities b(t) and $a_1(t)$–$a_M(t)$ of the (M+1) passive optical projections.

At step 56, the PR algorithm 50 includes estimating an error in the estimated value of the transmitted optical signal x'(t), i.e., from step 54. The error estimate may be, e.g., based on a next estimate x"(t) for the transmitted optical signal, e.g., as evaluated via digital back propagation over the optical fiber line 16. In Pseudo-Code Block A, the next estimate x"(t) may be obtained from the performance of part or all of the mGS algorithm 60. In step 56, the estimated error may be a moving average of estimated errors for a set of times t, as shown in Pseudo Code Block A. If the estimated error is greater than or equal to a preselected value ε, the PR algorithm 50, in Pseudo-Code Block A, includes looping back 57 to perform more iterations of the mGS algorithm 60 for times t in said set of times. During the loop back, i.e., prior to performing more iterations of the mGS algorithm, the phases of the s(t)'s, of the set of times, are re-initialized, e.g., incremented or decremented by a small randomly fixed amounts, to enable further convergence of the iterative evaluation of x'(t)'s, for the set of times t. If the estimated error is less than the preselected value ε, the Pseudo-Code Block A outputs, at step 58, the estimates of the transmitted optical signal x'(t) as the determined values thereof, i.e., for the various times t in the set.

Pseudo-Code Block A—PR Algorithm function PR($a_i(t)$, b(t), N, K)
{
% Step 52: Initialize array A(t) and s(t)
for k=1 . . . M
  {A(t)}$_k$=$a_k(t)$·exp[i·(random-angle)]};
s(t)=$\Sigma \cdot [H \cdot T]^{-1} \cdot A(t)$;
% Step 54: Performing repetitions of mGS algorithm to estimate x'(t)
p=1;
for p≤M/K do % outer loop done M/K times with small phase resets
{
m=1;
for m≤K do % inner loop done K times without phase resets
{ s(t), x'(t)=mGS(s(t), $a_i$(t), b(t)); % do mGS algorithm to estimate s(t) and x'(t)
m=m+1; % Increase m for next repetition of mGS algorithm
}
end;
% Step 56: Find error in estimate of x'(t)
x"(t)=$h_{CD}^{-1}$(t)*s(t); % Back propagate s(t) to optical transmitter to get second estimate
    % x"(t) of transmitted optical signal for time t
Err(t)=∥x'(t)∣²−∣x"(t)∣²∣; % Err(t), i.e., error is absolute value of difference in square magnitudes
    % of transmitted signal x'(t) from mGS algorithm and transmitted
    % optical signal x"(t) from back propagation of s(t) to optical data
    % transmitter
AVErr(t)=MV(Err(t)); % Average error AVErr(t) is moving average MV( ) of error over a set of
    % times t, i.e., to smooth peaks at the individual times tin the set
if AVErr(t)>ε
    {
    x'(t)=∣l'(t)∣·exp(i·(Ph(x'(t))+random-angle)); % Adjust x'(t) phase by small random change
    s(t)=$h_{CD}$(t)*x'(t); % Downstream propagate x'(t) to update phase of s(t) with a small
        % random adjustment for the next iterations of the mGS algorithm
    p=p+1;
    }
else if AVErr(t)≤ε
% Step 58
return x'(t); % For "t" in the set of times t, output estimates of transmitted optical signal x'(t)
}

Referring to FIG. 7 and Pseudo-Code Block B, the mGS algorithm 60 estimates the transmitted and received optical signals x'(t) and s(t) from an input value for the received optical signal s(t) and input values of the measured intensities b(t), {$a_i$(t)}, i.e., i=1 . . . M, of the (M+1) passive optical projections of the data-modulated optical signal, as received by the DD optical data receiver 14_2, 14_3, 14_4. That is, the mGS algorithm 60 estimates the phase and amplitude of the transmitted data-modulated optical signal based on an initial input for s(t) and measurements of intensities by the DD optical data receiver 14_2, 14_3, 14_4.

At step 62, the mGS algorithm 60 includes evaluating a back propagation of the input value for the optical signal s(t) received at the DD optical data receiver, to obtain a first estimate of the transmitted optical signal x'(t). The evaluation is for a back propagation by the optical fiber line 16 from the DD optical data receiver 14_2-14_4 to the optical data transmitter 12 of FIG. 1. The evaluation of the back propagation is based on the known optical channel function $h_{CD}$(t) for the optical fiber line 16. In Pseudo-Code Block B, the evaluation of the back propagation may also include bandwidth filtering the optical signal x'(t), e.g., to account for known optical filtering in the optical transmitter 12 and/or may include constraining x'(t) to have known optical pilot symbol values for the slot times "$t_p$" of said known optical pilot symbols.

At step 64, the mGS algorithm 60 includes estimating the received optical signal s(t) by forward propagating the first estimate of the transmitted optical signal x'(t), i.e., from the step 62. In the Pseudo-Code Block B, the evaluation is for forward propagation via the optical fiber line 16 from the optical data transmitter 12 of FIG. 1 to the DD optical data receiver 14_2-14_4. This evaluation is again based on the known channel matrix $h_{CD}$(t) for the optical fiber line 16.

At step 66, the mGS algorithm 60 includes improving the estimate of the received optical signal s(t), from step 64, by evaluating the first passive optical projection of s(t) and correcting said evaluation based on the measured intensity b(t) for said passive optical projection. The first passive optical projection is done by the dispersive first optical path 30 of the DD optical data receiver 14_2-14_4. In the Pseudo-Code Block B, the known dispersive channel matrix W0 of the first optical path 30 is used to evaluate a forward propagation of the estimate of the received optical signal s(t), from the step 64, through the optical power splitter 20 and the dispersive first optical path 30 to obtain an evaluation of the first passive optical projection of s(t). Then, the evaluation of the first passive optical projection is then, corrected to have the measured intensity b(t). Finally, an evaluation of a back propagation of said corrected evaluation of the first passive optical projection through the dispersive first optical path 30 and the optical power splitter 20 is performed to obtain the improved estimate of the received optical signal s(t).

At step 68, the mGS algorithm 60 includes further improving the improved estimate of received optical signal s(t), from the step 66, by evaluating the M other passive optical projections and correcting said M evaluations to have the measured intensities $a_i$(t). In the Pseudo-Code Block B, the known optical processing by the optical power splitter 20 and the passive optical processing unit 34, i.e., with the T and M modules, that causes mixing of portions of the received optical signal, is used to evaluate these other M passive optical projections from the improved estimate of the received optical signal s(t), from the step 66. Then, said M evaluations of the other M passive optical projections, for time t, are corrected to have the intensities $a_i$(t), for i=1 . . . M, measured by the DD optical data receiver 14_2-14_4. Finally, the Pseudo-Code Block B includes evaluating a back propagation of said corrected evaluations of these other M passive optical projections though the passive optical processing unit 34 and the optical power splitter 20 to obtain the further improved estimate of the received optical signal s(t).

At step 70, the mGS algorithm 60 returns the final estimates of the transmitted and received optical signals x'(t) and s(t), respectively, Pseudo-Code Block B: Modified Gerchberg-Saxton ("mGS") Algorithm function mGS(s(t), $a_i$(t), b(t))
{
% Step 62: Estimate transmitted optical signal x'(t) from input s(t) by evaluating back propagation
x'(t)=$h_{CD}^{-1}$(t)*s(t); % Back propagate s(t) based on channel matrix $h_{CD}$(t) of optical fiber line 16
x'(t)=$h_{BW}$(t)*x'(t); % Filter optical signal by bandwidth filter function $h_{BW}$(t) of
    % optical data transmitter 12
x'($t_p$)=$x_P$; % Adjust x'(t) to have known pilot symbol value(s) $x_P$ at pilot time(s) $t_P$
% Step 64: Estimate received optical signal s(t) by forward propagating x'(t)
s(t)=$h_{CD}$(t)*x'(t); % Forward propagate x'(t) over the optical fiber line 16 based on $h_{CD}$(t)
% Step 66: Improve estimate of s(t) by evaluating and correcting first passive optical projection d(t)=$h_D$(t)*s(t); % Evaluate optical projection d(t) via channel matrix $h_D$(t) of first optical path 30
d(t)=[b(t)]$^{1/2}$·exp[i·Ph(d(t))]; % Constrain d(t) to have measured intensity b(t).
    % Ph( ) is the phase angle of ( ).
s(t)=[$h_D$(t)]$^{-1}$*d(t); % Back propagate over first optical path 30 to get improved estimate of s(t)
% Step 68: Further improve estimate of s(t) by evaluating and correcting M other optical projections
For j=1 M, initially j=1, do % Loop to evaluate M-component array A(t)
{
Ph($a_j$(t))=Ph([H·T·S·A(t)]$_j$); % Evaluate propagation of s(t) through optical power splitter S and
    % optical H·T module to find phases of other M passive optical projections
$A_j$(t)=$a_j$(t) exp[i·Ph($a_j$(t))]; % A(t) is an M component array with j-th component $A_j$(t), these M
    % passive optical projections are corrected by measured intensities thereof
}
s(t)=Σ·[H·T]$^{-1}$·A(t); % Back propagate A(t), i.e., array of M corrected passive optical projections,
    % through passive optical processing unit 34 and optical power splitter 20 to
    % get more improved estimate of received optical signal s(t). Σ matrix is the
    % reverse combining action of M optical outputs of optical power splitter 20.
return s(t), x'(t);}

In other embodiments, the passive optical processing unit 34 of FIG. 3 may be replaced by a passive optical processor that combines the passive optical processing to relatively delay and to optically mix the M portions of the optical signal input thereto.

Also, in some embodiments, which employ polarization multiplexing, some of the pilot symbols may be precalculated for phase recovery based on the polarization coupling in the optical fiber channel(s).

In some embodiments, temporally overlapping, time blocks of sequentially measured intensities of the optical projections and/or light fields, i.e., at different times t, may be used to evaluate Fourier transforms in the above-described iterative algorithms of the DSP 28. In such embodiments, the converged results of iterative estimates of phase values may only be finally retained, i.e., at the termination of the iterative algorithms, for non-overlapping portions of said time blocks, based on measured intensities for said individual blocks, so that said evaluations do not depend significantly on the size(s) of the time blocks used in the algorithms In some embodiments, other circuits of the DSP 28 of FIGS. 2-5 may digitally perform optical equalization, e.g., to compensate for chromatic dispersion, polarization rotation and/or polarization mode dispersion. Also, the results of such a digital optical equalization may also be fed back to the loops of the iterative algorithms, e.g., the PR and mGS algorithms 50, 60 of FIGS. 6-7, to improve estimates of the phases and amplitudes of the light fields being recovered and thereby further aid the convergence of the iterative algorithms or to increase the rate of convergence thereof, e.g., to correct evaluated values of pilot symbols. Also, such feedback may be used to adjust intensity measurements of different polarizations of pilot symbols in embodiments supporting polarization division multiplexing.

From the disclosure, drawings, and claims, other embodiments of the inventions will be apparent to those skilled in the art.

What is claimed is:

1. An apparatus, comprising:
a direct-detection optical data receiver to receive a data-modulated optical carrier, the receiver comprising an optical power splitter, an array of at least three optical intensity detectors, and a digital signal processor; and
wherein the digital signal processor is connected to receive digital values of intensity measurements from each of the optical intensity detectors of the array and to recover data of the received data-modulated optical signal from the digital values of the intensity measurements;
wherein the first optical intensity detector is connected to receive light from the optical power splitter via a dispersive optical path and the remaining of the optical intensity detectors of the array are connected to receive light from the optical power splitter via a multiple input and multiple output passive optical processing unit; and
wherein the passive optical processing unit is configured to optically mix light received on different optical inputs thereof.

2. The apparatus of claim 1, wherein the passive optical processing unit is configured to optically mix light from at least two optical inputs thereof with a relative time delay.

3. The apparatus of claim 2, wherein the relative time delay is bigger than a temporal broadening produced by the dispersive optical path on data symbols of the received data-modulated optical signal.

4. The apparatus of claim 1, wherein the passive optical processing unit is configured to optically mix light from at least three of the optical inputs thereof.

5. The apparatus of claim 1, wherein the apparatus is configured to not optically mix light in the dispersive optical path with light in the passive optical processing unit.

6. The apparatus of claim 1, wherein the apparatus includes at least four of the optical intensity detectors and the passive optical processing unit has at least, three optical inputs and three optical outputs.

7. The apparatus of claim 6, wherein the apparatus is configured to not optically mix light in the dispersive optical path with light in the passive optical processing unit.

8. The apparatus of claim 6, wherein the digital signal processor is configured to recover, at least, phase-modulated data of the received data-modulated optical signal from the digital values of intensity measurements.

9. The apparatus of claim 1, wherein the digital signal processor is configured to recover, at least, phase-modulated data of the received optical signal from the digital values of the intensity measurements.

10. The apparatus of claim 9, wherein the optical processing unit is configured to optically mix light from at least two optical inputs thereof with a relative time delay.

11. The apparatus of claim 10, wherein the relative time delay is bigger than a temporal broadening produced by the dispersive optical path on data symbols of the received data-modulated optical signal.

12. The apparatus of claim 9, wherein the apparatus is configured to not mix light in the dispersive optical path with light in the passive optical processing unit.

13. The apparatus of claim 9, wherein the apparatus includes at least four of the optical intensity detectors and the passive optical processing unit has at least, three optical inputs and three optical outputs.

14. The apparatus of claim 1, wherein the direct-detection optical data receiver is configured, at least, to recover phase-modulated data from two polarizations of a polarization division multiplexed optical signal.

15. The apparatus of claim 1, further comprising an optical data transmitter configured to phase-modulate data onto an optical carrier, the optical data transmitter being optically connected to transmit the phase-modulated optical carrier to the direct-detection optical data receiver.

16. The apparatus of claim 1, wherein the digital signal processor is configured to determine data carried by the received data-modulated optical signal by digitally estimating optical projections thereof by the dispersive optical path and the passive optical processing unit.

17. The apparatus of claim 1, wherein the digital signal processor is configured to correct said digital estimates of the optical projections based on the digital values of the measured intensities.

\* \* \* \* \*